United States Patent
Burkhalter et al.

(10) Patent No.: US 10,099,779 B2
(45) Date of Patent: Oct. 16, 2018

(54) FLEXIBLE WHEEL DRIVE FOR AIRCRAFT ONBOARD TAXI SYSTEMS

(71) Applicant: Meggitt Aircraft Braking Systems, Akron, OH (US)

(72) Inventors: Kurt Burkhalter, Akron, OH (US); Michael P. Osburn, Canton, OH (US)

(73) Assignee: Meggitt Aircraft Braking Systems Corporation, Akron, OH (US)

( * ) Notice: Subject to any disclaimer, the term of this patent is extended or adjusted under 35 U.S.C. 154(b) by 329 days.

(21) Appl. No.: 15/091,805

(22) Filed: Apr. 6, 2016

(65) Prior Publication Data

US 2016/0297517 A1    Oct. 13, 2016

Related U.S. Application Data

(60) Provisional application No. 62/145,563, filed on Apr. 10, 2015.

(51) Int. Cl.
 *B64C 25/36* (2006.01)
 *B64C 25/40* (2006.01)

(52) U.S. Cl.
 CPC ............ *B64C 25/405* (2013.01); *B64C 25/36* (2013.01); *Y02T 50/823* (2013.01)

(58) Field of Classification Search
 CPC ....... B64C 25/34; B64C 25/42; B64C 25/405; B64C 25/36; B64C 25/10; B64C 25/50; B64C 25/58; Y02T 50/823
 See application file for complete search history.

(56) References Cited

U.S. PATENT DOCUMENTS

| | | | | |
|---|---|---|---|---|
| 3,880,219 A | * | 4/1975 | Mitchell ................ | B60B 25/22 152/404 |
| 4,989,657 A | * | 2/1991 | Lipper .................... | B60B 25/04 152/396 |
| 6,550,510 B2 | * | 4/2003 | Champion .............. | B60B 25/14 152/409 |
| 7,779,877 B2 | * | 8/2010 | Putz ......................... | B60B 3/16 152/396 |
| 8,925,604 B2 | * | 1/2015 | Putz ....................... | B60B 23/06 152/405 |
| 2003/0080609 A1 | * | 5/2003 | Darnell .................... | B60B 5/02 301/95.11 |
| 2007/0290549 A1 | * | 12/2007 | Zabaleta ................. | B60B 3/002 301/95.11 |
| 2013/0056580 A1 | * | 3/2013 | Gilleran ................ | B64C 25/405 244/50 |
| 2016/0101846 A1 | * | 4/2016 | Perkins ................. | B64C 25/405 301/6.2 |

* cited by examiner

*Primary Examiner* — Assres H Woldemaryam
(74) *Attorney, Agent, or Firm* — Renner, Kenner, Greive, Bobak, Taylor & Weber Co., L.P.A.

(57) ABSTRACT

A flexible wheel drive for aircraft onboard taxi systems is provided. In association with an aircraft wheel assembly there is provided a drive gear assembly that is adapted to be driven by a motor mounted to an aircraft. A flexible drive flange is secured about an inboard rim of the aircraft wheel assembly and a flexible ring is interconnected between the drive gear assembly and the flexible drive flange. Preferably, the flexible ring is made of a metal textile or high-temperature composite and the drive flange is of a high-strength stainless steel.

15 Claims, 4 Drawing Sheets

FLEXIBLE WHEEL DRIVE FOR AIRCRAFT ONBOARD TAXI SYSTEMS

CROSS-REFERENCE TO RELATED APPLICATIONS

This application claims the benefit of U.S. Provisional Patent Application No. 62/145,563, filed Apr. 10, 2015, for "Flexible Wheel Drive for Aircraft Onboard Taxi System," which is incorporated herein by reference.

TECHNICAL FIELD

The invention herein resides in the art of aircraft wheel control systems and, more particularly, to the drive mechanisms for such systems. More specifically, the invention relates to a flexible wheel drive mechanism for onboard taxi systems for aircraft, accommodating deflection between the aircraft and the driven wheel during taxiing.

BACKGROUND OF THE INVENTION

In order to transmit torque from an onboard taxi system to a main wheel, there needs to be some form of drive gear or similar mechanism that connects the wheel to the transmission. However, aircraft wheels and axles flex considerably due to the loads imposed on them by aircraft operations on the ground. This flexing of the wheel and its interconnection with the aircraft makes it quite difficult to connect the wheel to the essentially rigid structures of the transmission and its drive gear. Such interconnection necessarily imposes significant stresses into the meshing gear interface unless appropriate design considerations are implemented.

In addition to managing the flexible-to-rigid structural transition, a design for the drive mechanism for an onboard taxiing system must not interpose an adverse impact on space utilization. Moreover, the structure and method of achieving the onboard taxiing system must have minimal impact on the critical thermal performance of the associated wheel and brake assembly. Accordingly, applicants have determined that the design should not obstruct airflow to and from the wheel, allowing ventilation to be maximized.

It has also been determined that since the taxi-drive interface will necessarily need to be connected and disconnected frequently whenever a wheel needs to be removed and reinstalled, this interface needs to minimize any maintenance burden.

DISCLOSURE OF INVENTION

In light of the foregoing, it is a first aspect of the invention to provide a flexible wheel drive for aircraft onboard taxi systems that allows a substantial portion of the interconnection between the wheel and the aircraft to remain intact with the aircraft when the wheel is removed and reinstalled.

Another aspect of the invention is to provide a flexible wheel drive for aircraft onboard taxi systems that is sufficiently flexible to accommodate aircraft wheel and axle flexure without compromising the integrity of the interconnection of the wheel and axle to the aircraft frame.

Still a further aspect of the invention is the provision of a flexible wheel drive for aircraft onboard taxi systems which is readily adaptable to being retrofitted to existing aircraft wheel assemblies.

The foregoing and other aspects of the invention that will become apparent as the detailed description proceeds are achieved by a wheel drive assembly for an aircraft onboard taxi system, comprising: an aircraft wheel assembly; a drive mechanism assembly adapted to be driven by a motor mounted to an aircraft; a flexible drive flange secured about an inboard rim of said aircraft wheel assembly; a flexible ring interconnected between said drive mechanism assembly and said drive flange; and wherein said flexible ring comprises a metal textile or high-temperature composite and said drive flange is of high-strength stainless steel.

Other aspects of the invention that will become apparent herein are achieved by a wheel drive assembly for an aircraft onboard taxi system, comprising an aircraft wheel assembly; a drive mechanism assembly connected to and driven by a motor mounted to an aircraft; a flexible drive flange secured about an inboard rim of said aircraft wheel assembly; and a flexible ring in operative connection with said drive mechanism assembly and in removable connection with said drive flange.

DESCRIPTION OF DRAWINGS

For a complete understanding of the various aspects and structures of the invention, reference should be made to the following detailed description and accompanying drawings wherein.

DETAILED DESCRIPTION OF PREFERRED EMBODIMENTS

Figure 1:
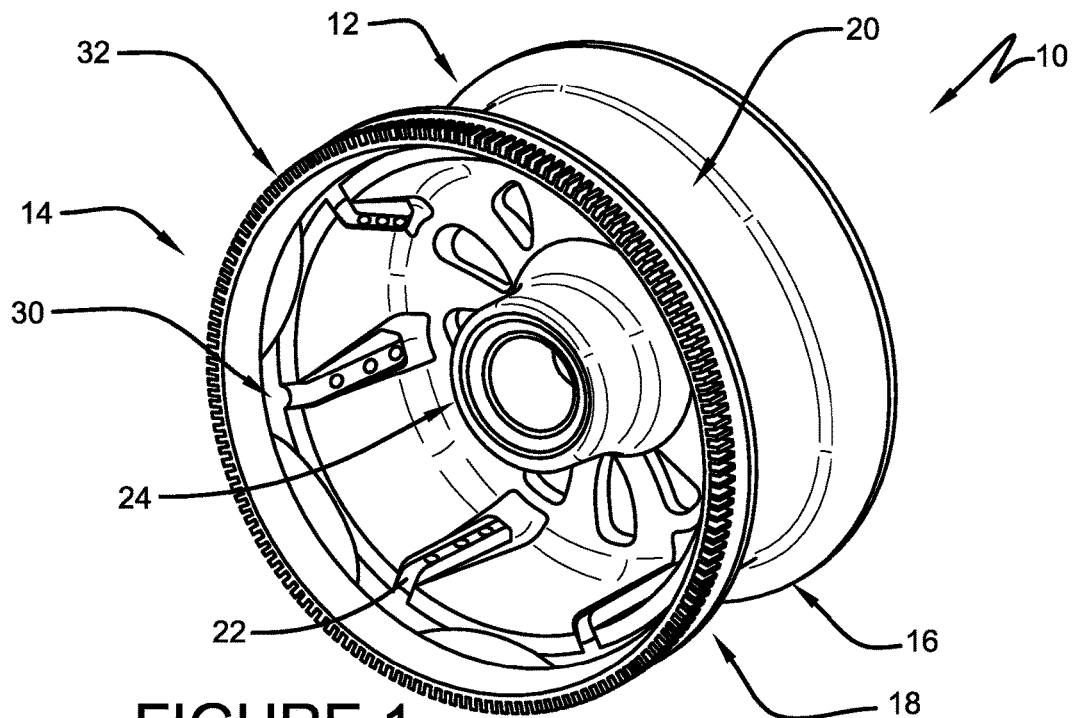
FIG. 1 is a first perspective view of an aircraft wheel incorporating the flexible drive assembly of the invention.
Figure 2:
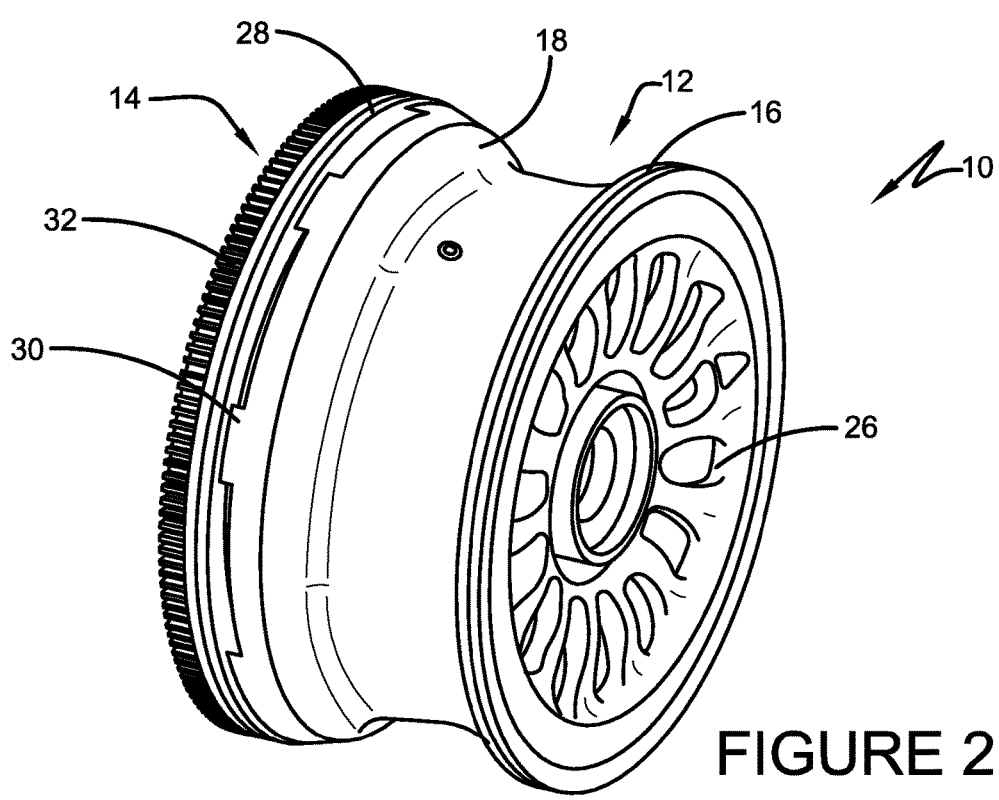
FIG. 2 is a second perspective view of the wheel assembly of FIG. 1.

Referring now to the drawings and more particularly FIGS. 1 and 2, it can be seen that an aircraft wheel with a flexible wheel drive structure for use in association with an aircraft onboard taxi system is designated generally by the numeral 10. Included in the structure 10 is an aircraft wheel assembly 12 having a flexible wheel drive structure 14 attached thereto. The wheel assembly 12 has an outboard rim 16 and an inboard rim 18, the flexible wheel drive structure being located at the inboard rim 18. A substantially cylindrical wheel body 20 is interposed between the rims 16, 18.

As best shown in FIG. 1, wheel keys 22 are secured to the inner surface of the cylindrical wheel body and are adapted to receive the rotor brake disks of a brake disk stack. Such structure is well known and understood by those skilled in the art. A wheel hub 24 extends centrally within the wheel assembly 10 and is adapted for receiving an axle of the aircraft. As shown in FIG. 2, the outboard end of the wheel assembly 12 is characterized by a ventilated end piece 26, centrally receiving the wheel hub 24. As shown, the ventilated end piece 26 is characterized by a plurality of elongated slots to allow the passage of air over the brake disk stack that would typically be received within the wheel assembly 12.

The primary elements of the flexible wheel drive structure 14 are shown in FIGS. 1 and 2 as comprising a flexible ring 28, a drive flange 30, and a drive mechanism such as a drive gear 32. The nature and structure of these elements is addressed below.

Figure 3:
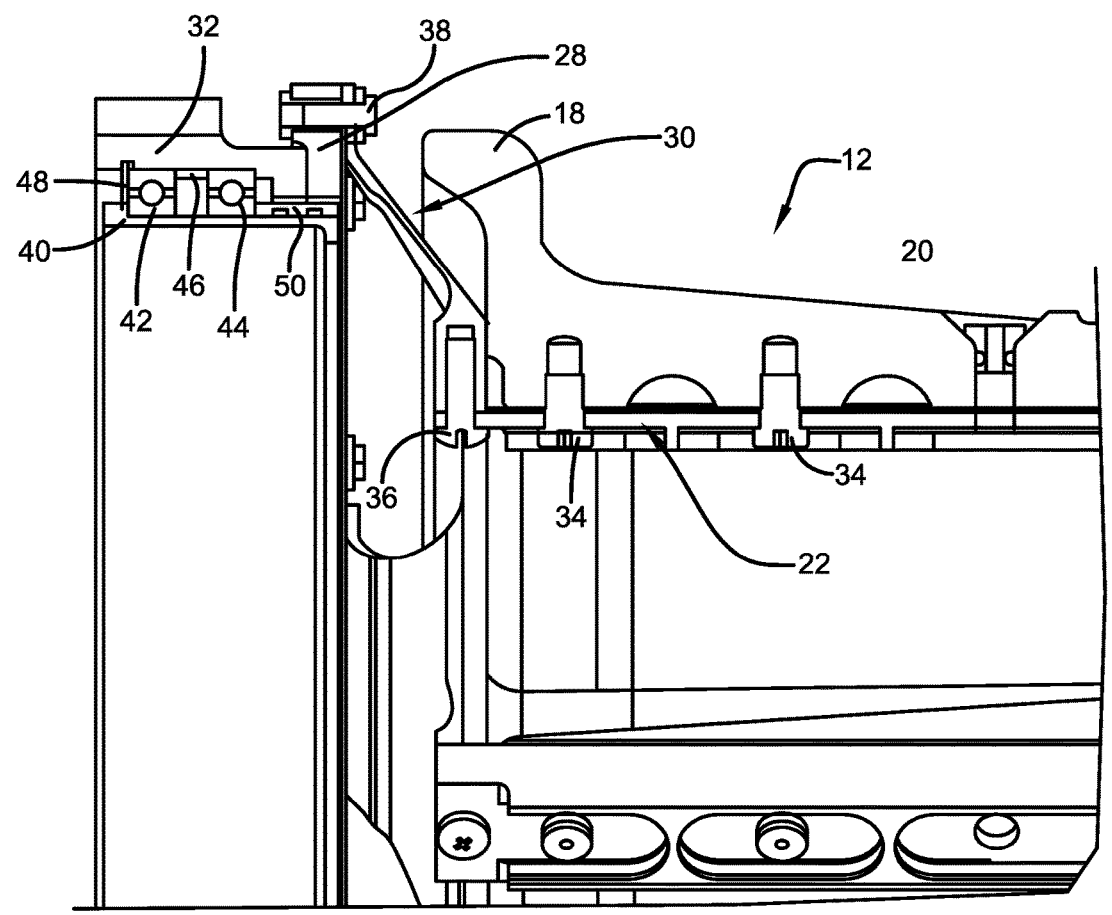
FIG. 3 is a cross-sectional view of an embodiment of the invention showing the interconnection of a flexible wheel drive assembly adapted to be driven by an onboard taxi system.
Figure 4:
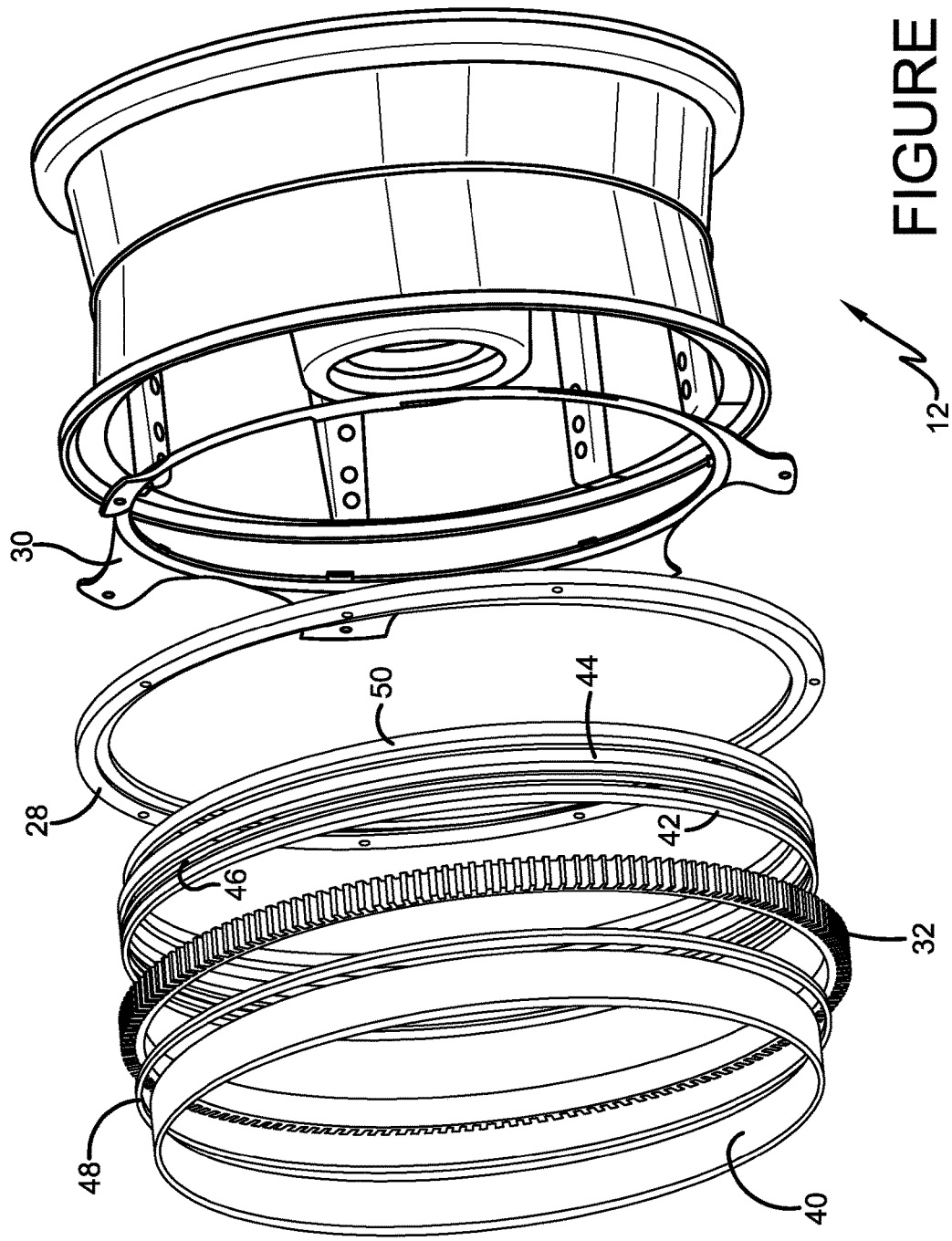
FIG. 4 is an assembly view of an aircraft wheel assembly made in accordance with the invention and showing the various elements of a flexible taxi drive assembly, and further showing those elements that remain a part of the aircraft and those that remain a part of the wheel assembly.

Referring now to FIGS. 3 and 4, it can be seen that the wheel key 22 is secured to the cylindrical wheel body 20 by means of appropriate screws 34. According to this embodiment of the invention, the wheel keys 22 are elongated to extend beyond the body of the wheel to a distance sufficient to receive the drive flange 30 secured to each of the wheel keys by means of screws 36, as shown. The drive flange 30 extends angularly as shown in FIG. 3 to a point of secured engagement to the flexible ring 28 by means of screws 38, fasteners, pins or the like. Accordingly, the drive flange 30 interconnects the wheel assembly 12 to the drive gear 32 and its associated structure, as shown.

With reference to both FIGS. 3 and 4, it can be seen that a bearing track 40 is adapted to receive bearings 42, 44 with an appropriate spacer 46 interposed therebetween. A snap ring 48 is positioned to hold the bearings 42, 44 and spacer 46 in place, as best shown in FIG. 3. A spacer 50 is also provided to positionally secure and retain the bearings 42, 44 and associated spacer 46 upon the bearing track 40.

Figure 5:
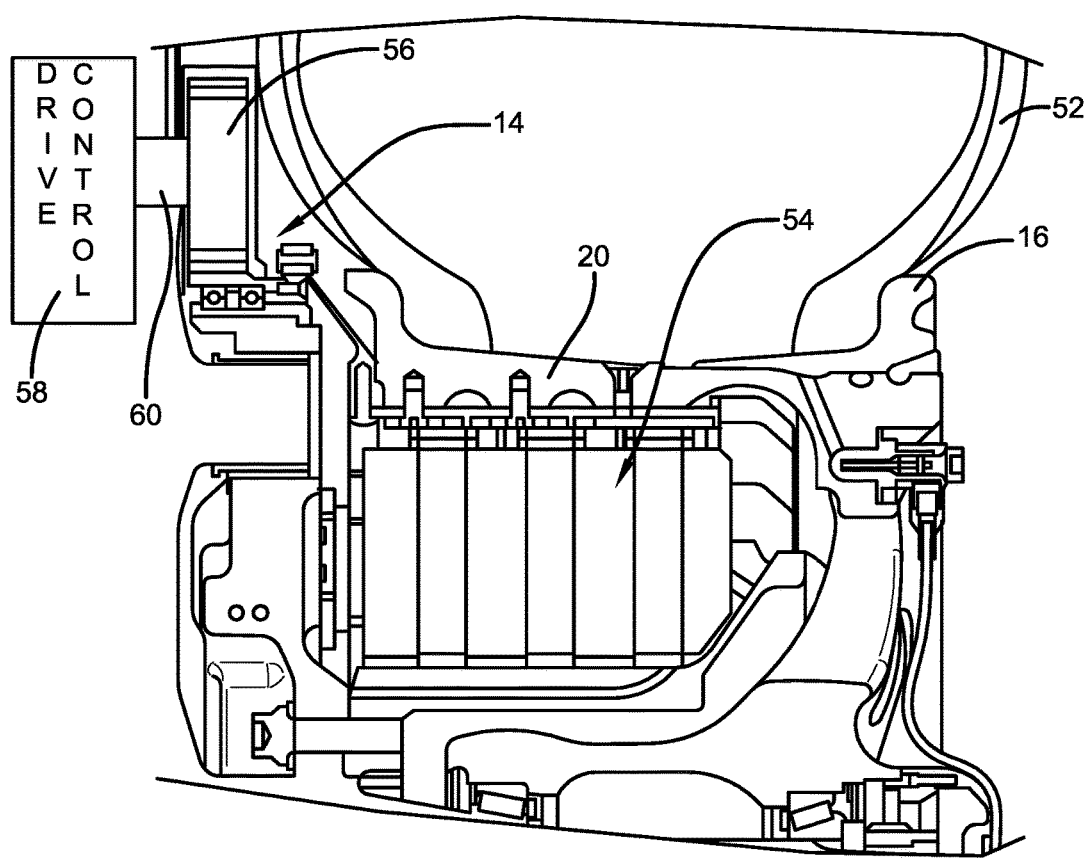
FIG. 5 is a cross-sectional view of a wheel and brake assembly of an aircraft employing the flexible wheel drive taxi system of the invention and showing the drive control interface thereof.

As shown in FIG. 5, the wheel assembly is shown with a tire 52 appropriately mounted and with the heat stack of alternatingly interleaved rotor and stator disks as designated generally by the numeral 54. A drive wheel 56 is provided in interengagement with the drive gear 32, the drive wheel 56 being driven by a motor of the drive control 58 through an appropriate drive shaft 60.

Those skilled in the art will appreciate that the flexible ring 28, drive gear 32, as well as the bearing track 40, bearings 42, 44, spacers 46, 50, and snap ring 48 all remain on the aircraft in association with the drive system 56-60 when the wheel 10 and drive flange 30 are removed therefrom by removal of the screws 38. Accordingly, removal and replacement of the wheel and brake assembly from the aircraft for service and the like may be readily achieved without disturbing the flexible connection achieved through the flexible ring 28 in drive flange 30.

It will be appreciated that the aircraft wheel with flexible wheel drive structure for an aircraft onboard taxi system 10 that has just been shown and described includes two flexible elements between the drive gear 32 and the wheel 12. The two flexible elements, comprising the flexible ring 28 and drive flange 30 combine to provide the ability to accommodate the deflection of the wheel without introducing high stresses into either element or into the drive gear itself. The flexible ring 28 connects to the drive gear through fasteners, pins or screws 38 providing serviceability. The drive flange 30 connects to the flexible ring through such fasteners, pins or screws, which can be secured in situ when the wheel assembly is installed on the axle. These fasteners transmit torque from the flexible ring 28 to the drive flange 30 and also keep the drive flange 30 in intimate contact with the flexible ring 28 to accommodate the wheel flexure by the combined action of both parts.

It is contemplated that the flexible ring will be a low-modulus but high-strength material such as a stainless steel mesh textile or a high-temperature composite. Because the system under consideration is in an area where high-temperature capability is essential, careful consideration needs to be given the materials employed. It is presently believed that elastomeric materials would likely be incapable of providing a robust solution, lacking both temperature capability and strength.

The drive flange 30 is contemplated to be of high-strength stainless steel (17-4 PH, for example). As shown in the drawings, the drive flange 30 is attached to the wheel 12 using a simple extension of the wheel keys 22. This attachment minimizes wheel modification compared to other attachment possibilities. The drive flange also features large cut-out areas, as best shown in FIG. 4, providing minimal blockage to air flow across the brake heat stack.

Combining the flexible ring 28 and drive flange 30 allows large deflections to be accommodated while only producing moderate stresses in the drive flange 30. The drive flange can therefore be comparatively light in weight while providing a robust attachment. The light, thin sections of the drive flange 30 accommodate some of the wheel deflection with the balance being carried by the flexible ring 28.

It will be appreciated that there are various ways in which the flexible ring 28 and drive flange 30 can be attached to their mating component, one possible way being shown in the drawings. It is contemplated that the embodiment of the drawings can be adjusted to different wheel types and, by using the wheel keys as a point of attachment, minimal impact need be made on the remainder of the design of the wheel assembly.

Thus, it can be seen that the various aspects of the invention are achieved by the structure presented above. While in accordance with the patent statutes, only the contemplated best mode and preferred embodiment of the invention has been presented and described in detail, the invention is not limited thereto or thereby. A representative claim contemplated for the invention is presented below.

What is claimed is:

1. A wheel drive assembly for an aircraft onboard taxi system, comprising:
    an aircraft wheel assembly;
    a drive mechanism assembly adapted to be driven by a motor mounted to an aircraft;
    a flexible drive flange secured about an inboard rim of said aircraft wheel assembly; and
    a flexible ring between said drive mechanism assembly and said flexible drive flange.

2. The wheel drive assembly for an aircraft onboard taxi system according to claim 1, wherein said drive mechanism comprises a drive gear, said drive gear being connected to said flexible ring.

3. The wheel drive assembly for an aircraft onboard taxi system according to claim 2, wherein said drive mechanism further comprises bearing assemblies supporting said drive gear.

4. The wheel drive assembly for an aircraft onboard taxi system according to claim 3, wherein said flexible ring is removably connected to said flexible drive flange.

5. The wheel drive assembly for an aircraft onboard taxi system according to claim 4, wherein said flexible drive flange is secured to said inboard rim through attachment to wheel keys.

6. The wheel drive assembly for an aircraft onboard taxi system according to claim 5, further comprising a brake heat stack and wherein said wheel keys engage rotors of said brake heat stack.

7. The wheel drive assembly for an aircraft onboard taxi system according to claim 4, wherein separation of said flexible ring from said flexible drive flange accommodates separation of said aircraft wheel assembly from said aircraft, said flexible drive flange remaining with said aircraft wheel assembly and said flexible ring and drive mechanism assembly remaining on said aircraft.

8. The wheel drive assembly for an aircraft onboard taxi system according to claim 7, wherein said flexible drive flange and flexible ring are interconnected by fasteners transmitting torque therebetween.

9. The wheel drive assembly for an aircraft onboard taxi system according to claim 8, wherein said flexible drive flange is made of high-strength stainless steel and said flexible ring is of a low-modulus, high-strength material.

10. The wheel drive assembly for an aircraft onboard taxi system according to claim 9, wherein said flexible ring is formed of a stainless steel mesh textile.

11. A wheel drive assembly for an aircraft onboard taxi system, comprising:
an aircraft wheel assembly;
a drive mechanism assembly connected to and driven by a motor mounted to an aircraft;
a flexible drive flange secured about an inboard rim of said aircraft wheel assembly; and
a flexible ring in operative connection with said drive mechanism assembly and in removable connection with said flexible drive flange.

12. The wheel drive assembly for an aircraft onboard taxi system according to claim 11, wherein said drive mechanism assembly comprises a drive gear mounted on bearings and driven by said motor.

13. The wheel drive assembly for an aircraft onboard taxi system according to claim 12, wherein said removable connection between said flexible drive flange and flexible ring accommodates separation of said aircraft wheel assembly from said aircraft with said flexible drive flange retained by said aircraft wheel assembly and said flexible ring and drive mechanism assembly retained by said aircraft.

14. The wheel drive assembly for an aircraft onboard taxi system according to claim 13, wherein said flexible drive flange is secured to said aircraft wheel assembly by keys, said keys also securing brake disc rotors to said aircraft wheel assembly.

15. The wheel drive assembly for an aircraft onboard taxi system according to claim 14, wherein said flexible drive flange is made of high-strength stainless steel and said flexible ring is formed of a stainless steel mesh textile.

* * * * *